(12) United States Patent  
Choate

(10) Patent No.: US 8,015,676 B1
(45) Date of Patent: Sep. 13, 2011

(54) SNAP HOOK WITH INTERLOCKING GATE

(75) Inventor: Gary E. Choate, Wheatridge, CO (US)

(73) Assignee: Reliance Industries, LLC, Marshall, TX (US)

( * ) Notice: Subject to any disclaimer, the term of this patent is extended or adjusted under 35 U.S.C. 154(b) by 783 days.

(21) Appl. No.: 12/079,144

(22) Filed: Mar. 25, 2008

(51) Int. Cl.
*F16B 45/02* (2006.01)
(52) U.S. Cl. .................. 24/599.5; 24/600.2; 294/82.2
(58) Field of Classification Search .................. None
See application file for complete search history.

(56) References Cited

U.S. PATENT DOCUMENTS

| | | | | |
|---|---|---|---|---|
| 679,088 | A | * | 7/1901 | Methven ................ 24/600.1 |
| 731,162 | A | * | 6/1903 | Carter ................... 24/600.1 |
| 1,521,811 | A | * | 1/1925 | Hartbauer .............. 24/600.8 |
| 1,525,292 | A | | 2/1925 | Greve |
| 1,576,352 | A | * | 3/1926 | Nordling ................ 24/600.1 |
| 1,622,971 | A | | 3/1927 | Porter |
| 1,626,866 | A | * | 5/1927 | Neilson ................. 294/82.2 |
| 1,753,326 | A | | 4/1930 | Yingling |
| 1,790,056 | A | * | 1/1931 | Moody .................. 294/82.2 |
| 1,879,168 | A | * | 9/1932 | Freysinger ............. 24/600.1 |
| 1,949,608 | A | | 3/1934 | Johnson |
| 1,964,428 | A | * | 6/1934 | Duffy .................... 24/600.1 |
| 1,985,596 | A | | 12/1934 | Bumham |
| 2,197,997 | A | * | 4/1940 | Dee ...................... 294/82.2 |
| 2,490,931 | A | | 12/1949 | Thompson |
| 2,514,656 | A | | 7/1950 | Manson |
| 2,657,446 | A | | 11/1953 | Roberts |
| 3,317,972 | A | | 5/1967 | Harley |
| 3,949,451 | A | | 4/1976 | Bunn |
| 4,062,092 | A | | 12/1977 | Tamada et al. |
| 4,122,585 | A | | 10/1978 | Sharp |
| 4,179,148 | A | | 12/1979 | Johnson |
| 4,434,536 | A | | 3/1984 | Schmidt et al. |
| 4,528,728 | A | | 7/1985 | Schmidt et al. |
| 4,528,729 | A | | 7/1985 | Schmidt et al. |
| 4,546,523 | A | * | 10/1985 | Bailey, Jr. .............. 24/599.4 |
| 4,908,913 | A | | 3/1990 | Mori |
| 4,977,647 | A | * | 12/1990 | Casebolt ................ 24/599.5 |
| 5,257,441 | A | | 11/1993 | Barlow |
| 5,579,564 | A | * | 12/1996 | Rullo et al. ............ 24/599.5 |
| 5,694,668 | A | | 12/1997 | Rohlf |
| 5,735,025 | A | * | 4/1998 | Bailey ................... 24/600.1 |
| 5,896,630 | A | | 4/1999 | Smith et al. |
| 6,161,264 | A | * | 12/2000 | Choate .................. 24/599.5 |

(Continued)

OTHER PUBLICATIONS

Simpson, Robert, letter dated Oct. 11, 2007, announcing the filing of patent application directed at snap hook shown in accompanying illustrations.

*Primary Examiner* — Jack W. Lavinder
(74) *Attorney, Agent, or Firm* — Ramon L. Pizarro; Edwin H. Crabtree

(57) ABSTRACT

A snap hook that includes gate that includes and aperture that accepts a male portion that protrudes from the nose portion of the hook is disclosed. The coupling of the nose portion and the gate prevents the unwanted opening of the gate while the hook is under extreme loads. Still further, the use of a slide bar that is moved through translation and rotation when opening the gate of the hook is also disclosed. The translation and rotation motion provides improved cooperation of the components and improves the resistance of undesired movement of the slide bar by forces against a protrusion on the slide bar, and thus provides greater resistance to unwanted opening of the gate.

7 Claims, 4 Drawing Sheets

U.S. PATENT DOCUMENTS

| | | |
|---|---|---|
| 6,283,524 B1 | 9/2001 | Simond |
| 6,363,589 B1 | 4/2002 | Calloway et al. |
| 6,718,601 B1 * | 4/2004 | Choate .................. 24/600.2 |
| 6,832,417 B1 | 12/2004 | Choate |
| 6,898,829 B2 * | 5/2005 | Loe et al. .............. 24/599.5 |
| 7,437,806 B2 * | 10/2008 | Lin ....................... 24/599.5 |
| 7,444,723 B2 * | 11/2008 | Lin ....................... 24/600.1 |
| 7,647,677 B2 * | 1/2010 | Casebolt ............... 24/600.1 |
| 2005/0193531 A1 * | 9/2005 | Chang .................. 24/600.2 |

\* cited by examiner

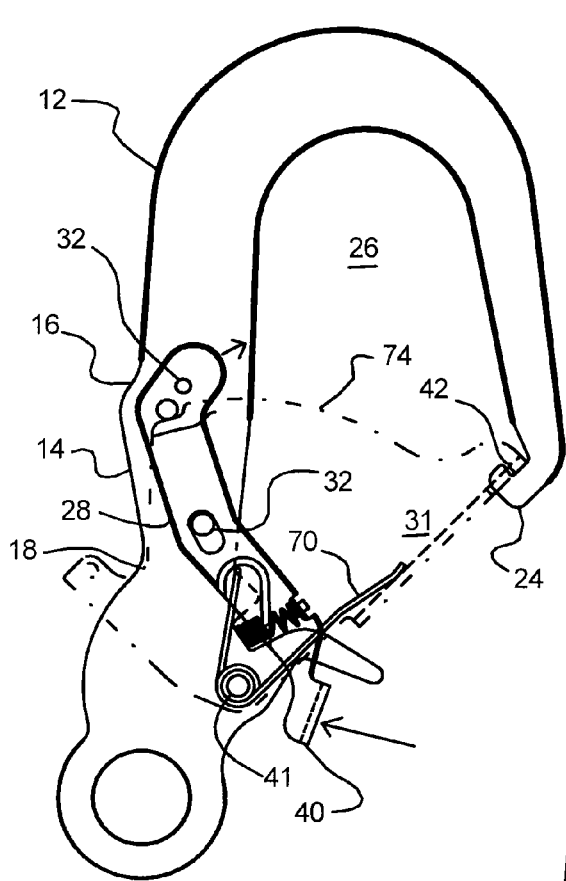
Fig. 3
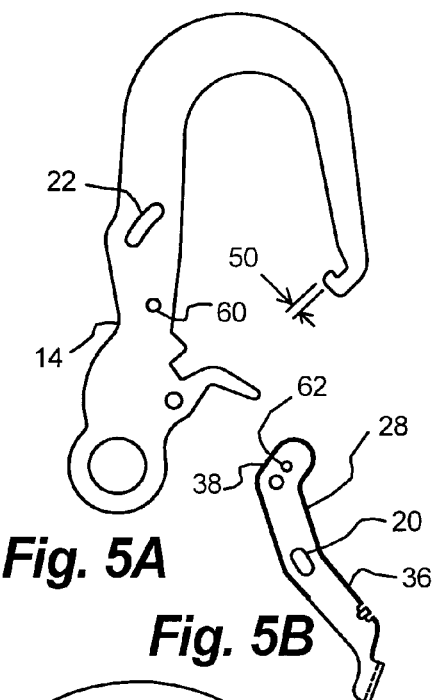
Fig. 5A
Fig. 5B
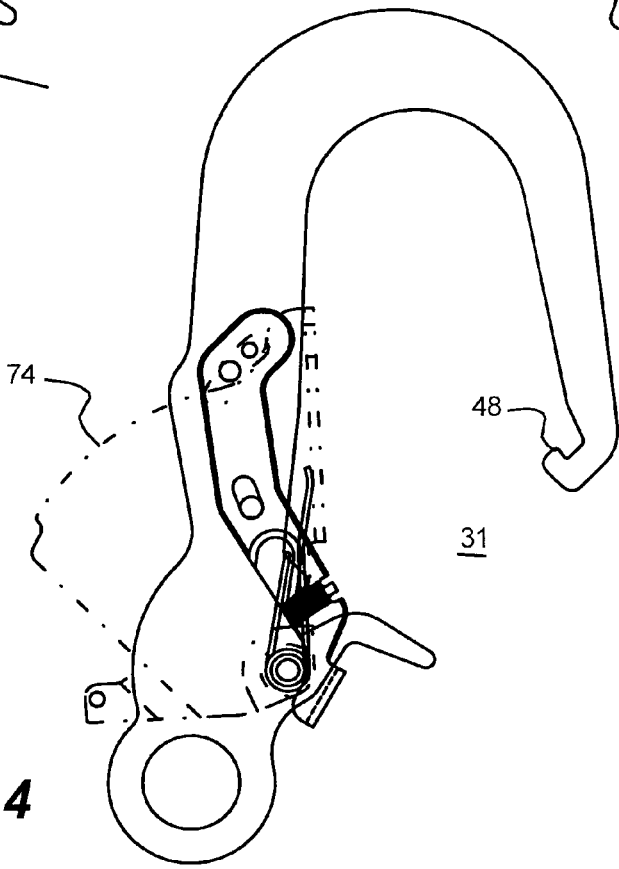
Fig. 4

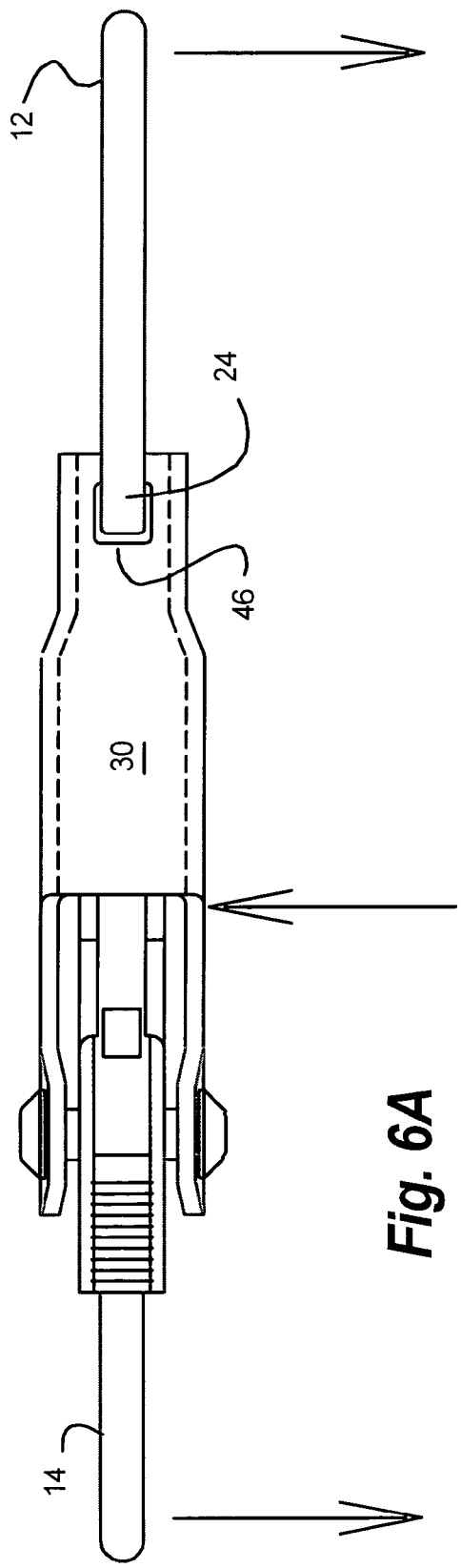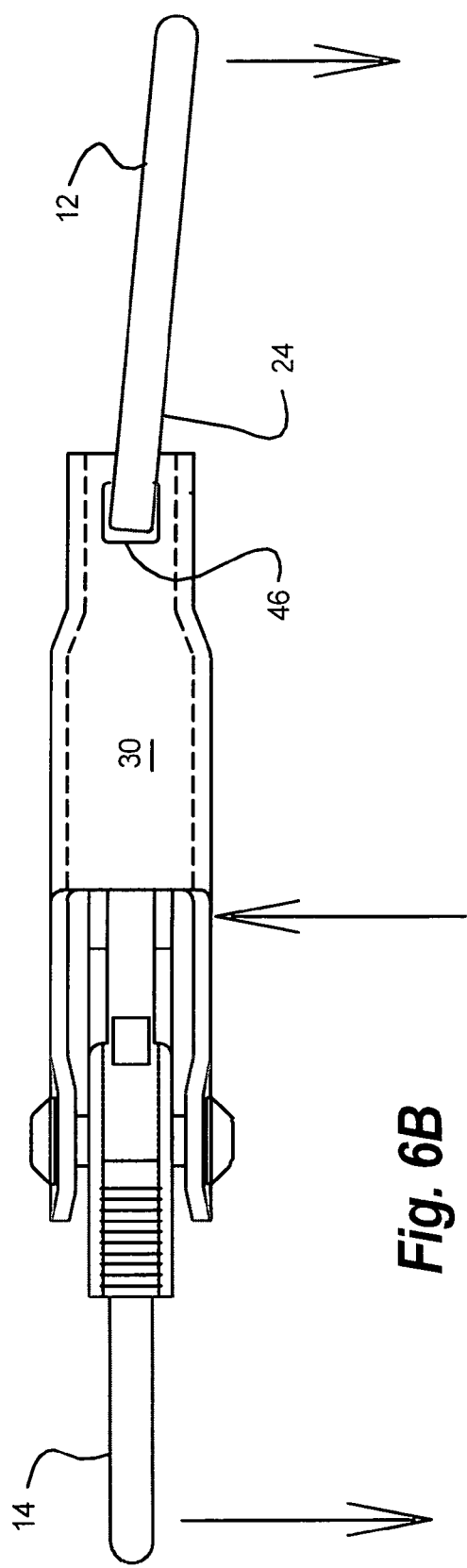

SNAP HOOK WITH INTERLOCKING GATE

REFERENCE TO RELATED APPLICATIONS

This application is discloses a hook with a locking gate. A hook with a locking gate is also disclosed in my co-pending application having Ser. No. 11/713,766, filed Mar. 2, 2007, titled Tie-back snap hook.

BACKGROUND OF THE INVENTION (a) Field of the Invention

This application relates to snap-hook that includes a locking mechanism for keeping the gate of the snap-hook in a closed or locked position. The snap-hook is designed for use with a lanyard in personal fall protection.

(b) Discussion of Known Art

Snap-hooks are extremely popular in the field of fall protection. These hooks are typically attached to a lanyard that is used between a worker and a support structure or feature. One end of the lanyard is attached by way of a safety hook to the back of a harness, while the other end of the lanyard is attached to some sort of support structure, such as a crane, a section of steel or rebar, or other attachment point specifically provided for restraining a fall. These safety hooks typically include a J-shaped hook portion that includes a gate that closes the mouth of the hook in order to prevent the inadvertent release of the hook.

Because of the variety of attachment points and work condition present during an instance where the safety hook and fall arrest systems must be deployed, the actual fall path and restrain conditions are rather unpredictable. Thus, the loading on a safety hook can vary depending on what occurs during the fall. For example, some fall conditions can cause the entire load from the fall to be reacted on the gate of the hook, which is typically the weakest portion of the hook. In order to ensure that the gate does not fail, safety hooks must have gates that are capable of resisting the loads from the fall without opening into or out of the mouth of the hook.

Often a worker will loop the lanyard that is connected to the snap hook around a pipe or beam and then snap it back onto itself. This enables the worker to use items such as pipes in a pipe rack or I-beams and other structures in building steel as anchorage tie off points where no other types of anchorage connections exists.

The use of the snap is connected or snapped back around the lanyard itself has several inherent problems. The first problem is that the lanyard webbing can lie across the inside of the snap gate. A danger with the use of snap hooks is that a snap, when looped over an I-beam with the edge of the gate against the flange of the I-beam, can fail by forces on the gate which can open by the due to the action of the I-beam pressing against the gate during fall arrest. Often, the snap-hooks that are being used to hold the lanyard in the J-shaped portion of the hook are rather large in order to provide enough space in the J-shaped portion and mouth to retain the lanyard without impeding the operation of the gate.

Often, when these large hooks are laid across a flat surface, such as the top of a beam, and the gate of the hook lays against the edge of the beam, the load introduced through the hook and to the gate as the gate bears against the edge of beam is magnified by the bearing of the gate against the nose portion of the hook. This situation is particularly problematic for a snap hook, since the cooperation of the gate with the nose of the hook is essential in order to maximize the structural efficiency of the hook. If the worker falls, the force required to arrest the fall is several times the weight of the falling worker. The large size of these hooks is a detriment to the hook's ability to safely resist these forces. The length of the body of the hook creates a large cantilevered lever that must resist the fall. The bending forces to be resisted inevitable tend to bend the body of the hook. However, the hook and gate must remain closed together in order to prevent the unwanted release of the lanyard.

SUMMARY

It has been discovered that the problems left unanswered by known art can be solved by providing a snap hook that includes:

a J-shaped body having a shank portion that includes a first end and a second end, the body further having a slot near the second end of the shank portion, a concave portion and a nose, the concave portion extending from the second end of the shank and terminating in the nose;

a slide bar, the slide bar being attached to the shank portion of the J-shaped body through at least two sliding connectors that allow translation and rotation of the slide bar along the shank portion of the J-shaped body, the slide bar including first end and a second end, the first end having a protrusion and the second end being connected to a trigger, the slide bar being moveable through the translation and rotation from a locking position to a release position;

a gate that is pivotally connected to the shank portion of the J-shaped body, the gate having a tip that is adapted for contacting the nose when the gate is in a closed position, and having a trailing edge, the trailing edge being adapted for cooperating with the protrusion on the slide bar such that when the slide bar is in the locking position the protrusion impedes rotation of the gate and when the slide bar is in the release position the protrusion does not impede the rotation of the gate.

Another important inventive feature disclosed here is the cooperation, and structure for achieving the cooperation, between the nose of the J-shaped body and the gate. It has been discovered that the cooperation of the nose and the gate greatly influences the strength, or load carrying capacity, of the disclosed snap hook. According to a highly preferred embodiment of the invention, the tip of the gate includes an aperture or recess and the nose of the hook includes a male portion that extends into the aperture or recess when the gate is in the closed position. It has been discovered that this arrangement allows the tip of the gate to link to the nose of the hook when the gate is closed. This linked arrangement prevents the undesired opening of the mouth of the hook when the snap hook is under extreme loading conditions. In known snap hook designs, these extreme loading conditions can lead to separation of the tip of the gate from the nose of the hook, resulting in the opening of the mouth of the hook, leaving the snap hook free to release lanyard or anything else that is being used to attach from.

In the disclosed invention the linking of the nose of the hook to the tip of the gate forces the tip and the nose to move together as the components of the snap hook are distorted under extreme loading. In known devices the body of the hook is far stiffer than the gate, which is commonly made from sheet metal. Also, in these known devices, the gate is attached to the shank of the hook and thus does not receive the same loading that the concave portion of the hook receives under load. The variation of the stiffness and loading inevitably leads to variations in deflections between the hook body and the gate under load, and these variations in deflection lead to separation and opening of the hook mouth. The disclosed invention solves this problem through the linking mechanism taught here.

Thus, when the snap hook is laying on its side, with both the gate and the shank of the hook resting on the edge of a surface such as the edge of an I-beam, concrete section with protruding rebar, or rebar matrix, and the hook is loaded by lanyard extending around the concave portion of the j-shaped body, as illustrated in FIGS. 6A and 6B, the loads on the hook must be reacted through a cooperation of the J-shaped body and the gate.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 3 illustrates the assembled invention shown in FIG. 1 with the gate in phantom lines, so as to illustrate the arrangement of the components of the disclosed invention when the gate is in the closed position.

FIG. 4 shows the components of FIG. 3 with the gate in the open position, exposing the mouth of the hook body.

FIG. 5A illustrates the hook body without the gate or the slide bar.

FIG. 5B illustrates the slide bar for use with the disclosed invention.

FIG. 6A illustrates is a free body diagram of loading of a snap hook, the loading illustrating the forces reacted by the snap-hook when used in a "tie-back" arrangement, where a lanyard is attached to the shank of the hook and then wrapped around a supporting object, such as an I-beam or bundle of rebar, for example, and then routed through the concave portion of the hook.

FIG. 6B illustrates the effect of extreme loading on the example of FIG. 6A and further illustrates the joint movement of the gate and the nose of the hook using the teachings disclosed here.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figures 1, 2:
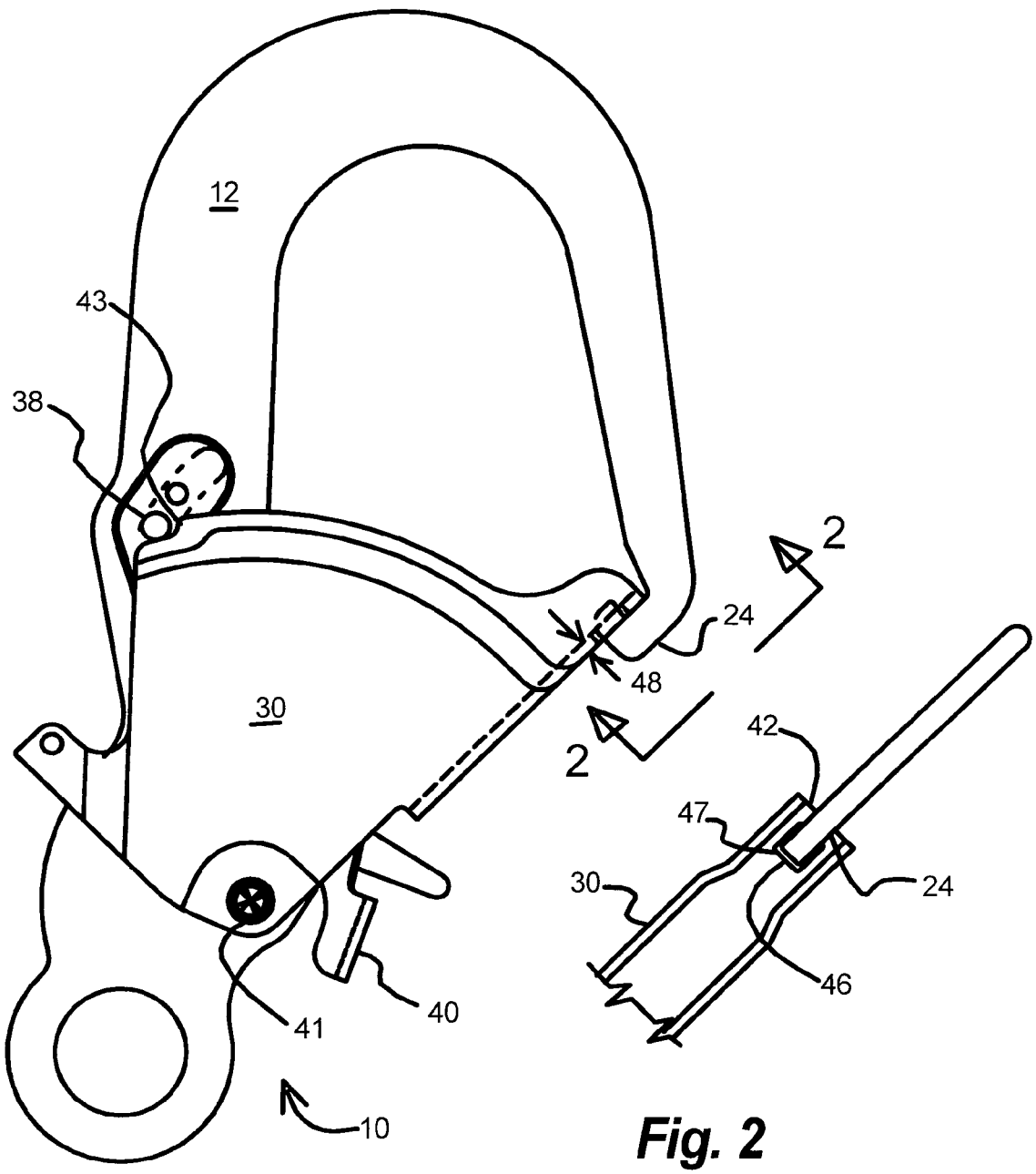
FIG. 1 illustrates the disclosed invention with the gate in a closed position.
FIG. 2 is a view taken from FIG. 1, in the direction of arrows labeled 2-2.
Figure 7:
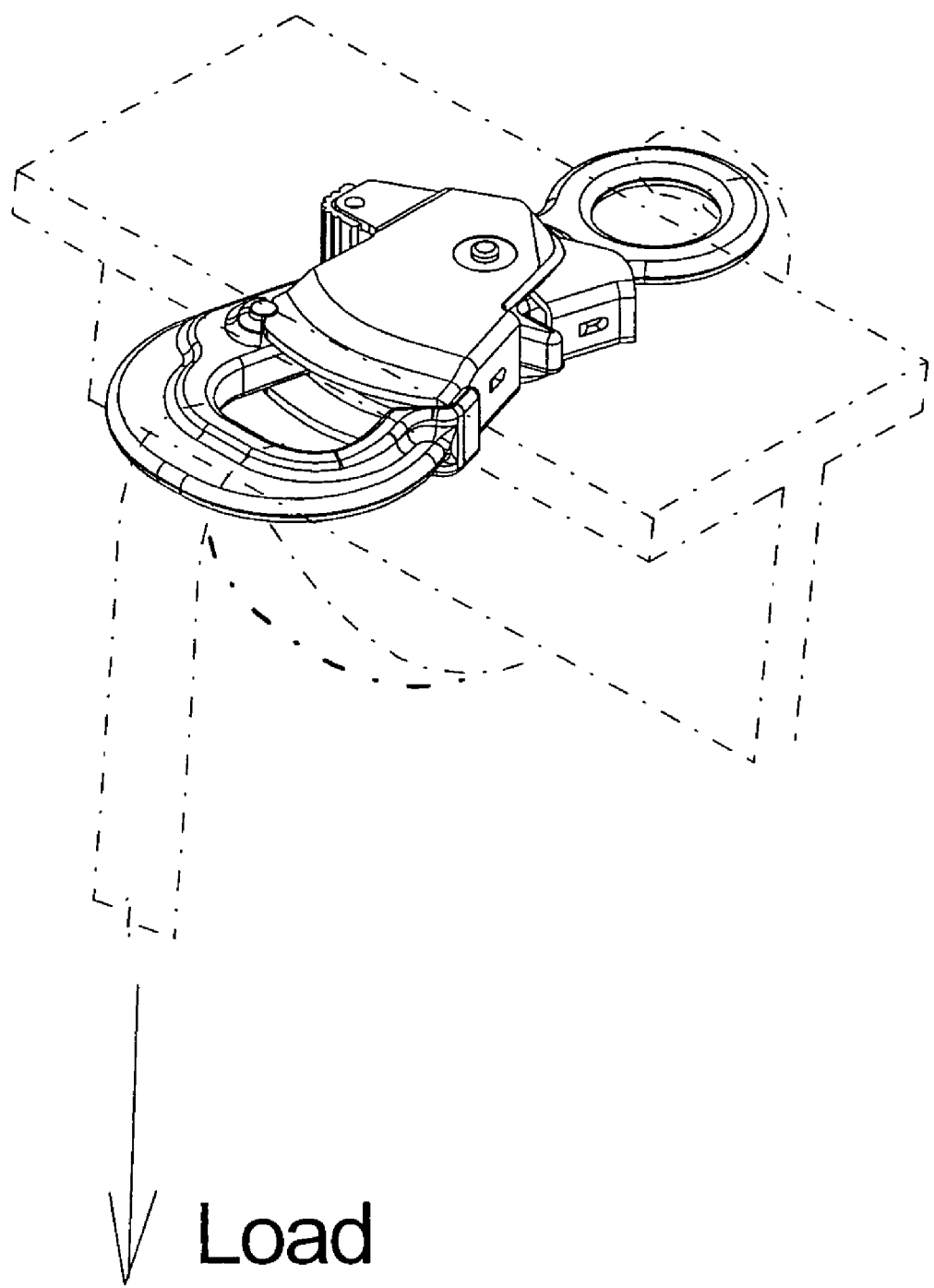
FIG. 7 illustrates the "tie-back" arrangement used as a basis for the loading diagram of FIGS. 6A and 6B.

Turning now to FIGS. 1 and 5A it will be understood that the disclosed snap hook 10 includes a J-shaped body 12 that has a shank portion 14 with a first end 16 and a second end 18. The shank portion 14 includes a first end 16 and a second end 18. As shown in FIG. 5A, the body 12 includes a first slot 20 at the second end 18 of the shank portion 14. These figures also illustrate that the J-shaped body 12 includes a nose 24 and a concave portion 26. The concave portion 26 extends from the second end 18 of the shank 14 and terminates at the nose 24.

The snap hook 10 uses a slide bar 28 to lock the gate 30 that is used to close the mouth 31 of the snap hook 10. The slide bar is attached to the shank portion 14 of the J-shaped body 12 through at least two sliding connectors 32 that allow translation and rotation of the slide bar 28 along the shank portion 14 of the J-shaped body 12. As illustrated in FIGS. 3 and 5B, the slide bar 28 includes first end 34 and a second end 36. As illustrated in FIGS. 1, 3 and 5B, the first end 34 includes a protrusion 38 that is used to lock the gate in a closed position, illustrated in FIG. 1. The second end 36 of the slide bar 28 is connected to a trigger 40 that is used move slide bar 28 from a locking position, illustrated in FIG. 1, to a release position, illustrated in FIG. 4, where the gate 30 is unlocked and allowed to move to an open position, illustrated in FIG. 4.

Referring now to FIGS. 3 4, 5A and 5B, it will be understood that the sliding connectors of the slide bar 38 use a pin or protrusion that slide in slots. In the illustrated preferred example the invention includes a first slot 60 that is substantially linear and incorporated into the slide bar 38, and a second slot 62 that is at an angle to the first slot 60. The second slot is incorporated into the J-shaped body 12. A first pin 64 that extends from the shank portion 14 rides in the first slot 60, while a second pin 66 that is mounted from the slide bar extends through the second slot 62. In the illustrated example the second slot 62 is also arced to allow for rotation of the slide bar 28, creating a stable, linear compression of the bar spring 68 when the trigger 40 is squeezed. Additionally, FIGS. 3 and 4 illustrate the use of a gate spring 70 to bias the gate to the closed position.

Thus, FIGS. 1, 3, and 4 illustrate that the gate 30 is attached to the shank portion 14 though a pivotal connection 41, which in a preferred embodiment is simply a pin. Also illustrated in FIGS. 1, 2 and 3 is that the gate 30 includes a tip 42 that is adapted for contacting the nose 24 when the gate 30 is in the closed position, illustrated in FIG. 1. The gate 30 also includes a trailing edge 43 that cooperates with the protrusion 38 on the slide bar 28 such that when the slide bar is in the locking position the protrusion impedes rotation of the gate and when the slide bar 28 is in the release position the protrusion does not impede the rotation of the gate 30 to the open position illustrated in FIG. 4. The figures also illustrate that the gate 30 will also include a fan-shaped edge 74 that will allow the protrusion 38 to slide along the fan-shaped edge 74 as the gate is opened, and trigger 40 pulled back while the gate is opened. Still further, the fan-shaped gate will provide a direct load path between the gate and the protrusion 38, such that any loads encountered by the gate in a direction that would open the gate will be directly reacted by the protrusion 38. This will provide a leveraged reaction to the force against the gate. The translation and rotation motion provides improved cooperation of the components and improves the resistance of undesired movement of the slide bar by forces against a protrusion on the slide bar, and thus provides greater resistance to unwanted opening of the gate.

Focusing now on FIGS. 1 and 2, it will be understood that the tip 42 of the gate 30 includes an aperture 46 and the nose 24 of the hook includes a male 44 portion that extends into the aperture 46 when the gate 30 is in the closed position. It has been discovered that this arrangement effectively links the gate 30 and the nose 24 together so that flexing of the snap hook 10 under extreme loads, as illustrated in FIG. 6B, will not allow the tip 42 of the gate 30 to become separated from the nose 24 of the hook. Also, because the nose 24 and the gate 30 become interlocked, the assembly is able to distribute the loads over a larger number of components, resulting in a stronger assembly.

As can be understood from FIGS. 1, 2, 6A and 6B, the aperture 46 preferably extends through the tip 42 of the gate and includes a closed perimeter 47 that extends tough the gate. Still further, it will be understood that it is preferred that the tip 42 of the gate 30 will be of a thickness 48 and that the male portion 44 will be of a length 50 that is greater than the thickness 48, so that the male portion 44 will extend through the aperture 46 when the gate is in the closed position, as illustrated in FIGS. 1 and 3. It is contemplated that a shorter relative length of the male portion 44 as compared to the thickness 48 of the tip 42 of the gate 30 will provide advantages of the invention disclosed here, but not as well as achieved with the illustrated preferred embodiment where the male portion is completely surrounded by the closed perimeter of the aperture when the gate is in the closed position. It is further contemplated that a barb-like protrusion may be further incorporated on to the male portion to further enhance the linkage between the nose and the gate.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A snap hook comprising:
    a J-shaped body having a shank portion that includes a first end and a second end, a concave portion and a nose, the concave portion extending from the second end of the shank and terminating in the nose;
    a slide bar, the slide bar being attached to the shank portion of the J-shaped body through at least two sliding connectors that allow translation and rotation of the slide bar along the shank portion of the J-shaped body, the slide bar including first end and a second end, the first end having a protrusion and the second end being connected to a trigger, the slide bar being moveable through the translation and rotation from a locking position to a release position; and
    a gate that is pivotally connected to the shank portion of the J-shaped body, the gate having a tip that is adapted for contacting the nose when the gate is in a closed position, and having a trailing edge, the trailing edge being adapted for cooperating with the protrusion on the slide bar such that when the slide bar is in the locking position the protrusion impedes rotation of the gate and when the slide bar is in the release position the protrusion does not impede the rotation of the gate.

2. The snap hook of claim 1 where the tip of the gate includes an aperture and the nose of the hook includes a male portion that extends into the aperture or recess when the gate is in the closed position.

3. The snap hook of claim 1 the tip of the gate includes an aperture with a closed perimeter extending tough the gate and the nose of the hook includes a male portion that extends into the aperture and is completely surrounded by the closed perimeter of the aperture when the gate is in the closed position.

4. The snap hook of claim 2 wherein the sliding connectors comprises a first slot that is substantially linear and a second slot that is at an angle to the first slot and the slide bar is slideably attached to the first slot and the second slot through separate pins that extend into the first slot and into the second slot.

5. The snap hook of claim 4 wherein said second slot is arced.

6. The snap hook of claim 2 wherein said male portion extends from the nose into the concave portion of the J-shaped body.

7. The snap hook of claim 2 wherein said gate tip is of a thickness and said male portion is of a length, the male portion length being greater than the thickness of the gate tip.

* * * * *